United States Patent [19]

Powell et al.

[11] Patent Number: 5,499,648

[45] Date of Patent: Mar. 19, 1996

[54] SEALING MEANS FOR PRESSURE RELIEF VALVES AND METHODS OF ASSEMBLY

[75] Inventors: Walter W. Powell, Sugarland; Louis R. Castaneda, Houston, both of Tex.

[73] Assignee: Groth Corporation, Houston, Tex.

[21] Appl. No.: 297,802

[22] Filed: Aug. 30, 1994

[51] Int. Cl.$^6$ .......................... F16L 55/18; F16K 31/145
[52] U.S. Cl. .......................... 137/15; 251/61.1; 251/61.2; 251/175; 251/187; 251/332
[58] Field of Search .................................. 251/61.1, 61.2, 251/332, 333, 175, 187, 158; 137/15, 315

[56] References Cited

U.S. PATENT DOCUMENTS

| | | | |
|---|---|---|---|
| 1,956,977 | 5/1934 | Shawn | 137/153 |
| 2,393,427 | 1/1946 | Sparrow | 251/61.2 |
| 2,412,490 | 12/1946 | Biggle | 137/144 |
| 3,211,418 | 10/1965 | Klinger-Lohr | 251/187 |
| 3,394,732 | 7/1968 | Lisciani | 137/533.21 |
| 3,477,456 | 11/1969 | Powell . | |
| 3,583,432 | 6/1971 | Powell | 137/489 |
| 3,722,852 | 3/1973 | Powell | 251/61.2 |
| 3,835,878 | 9/1974 | Braidt et al. | 251/175 |
| 4,312,375 | 1/1982 | Leinemann | 137/489 |
| 4,705,065 | 11/1987 | McNeely | 137/484.6 |
| 4,779,641 | 10/1988 | Charm et al. | 251/61.2 |
| 5,163,471 | 11/1992 | Powell | 137/594 |

OTHER PUBLICATIONS

Seminar Survey "Groth Pressure/Vacuum Relief Valves And Flame Arresters" Groth Corporation, 1993.

*Primary Examiner*—A. Michael Chambers

*Attorney, Agent, or Firm*—Bush, Moseley, Riddle & Jackson

[57] ABSTRACT

A safety relief valve (12) for a pressure vessel (10) in which the main valve member (28) includes a valve plate or disc (52) and a retainer plate (64) having a flexible membrane or diaphragm (62) stretched therebetween in a taut relation to provide a frusto-conical shape (FIG. 3) for obtaining bubble-tight sealing against valve seat (26). A fluid chamber (116) is provided between valve plate (52) and retainer plate (64) and inlet fluid pressure is communicated through opening (118) of jack screw (106) to the fluid chamber (116) for providing inlet fluid pressure thereto to force valve plate (52) and retainer plate (64) apart for tensioning of flexible membrane (62) into a frusto-conical shape. A jack screw (106) is threaded within a bushing (94) carried by retainer plate (64). Upon rotation of jack screw (106), valve plate (52) and retainer plate (64) are forced away from each other for tensioning flexible membrane (62) into a frusto-conical shape. The initial sealing of main valve member (28) is by contact of flexible membrane (62) with seat (26) and the sealing pressure increases as the inlet pressure increases due to differential pressure across the flexible membrane (62). The method of assembly includes the forcing of valve plate (52) and retainer plate (64) away from each other with manual adjusting means (106) to tension the flexible membrane (62) a predetermined amount into a frusto-conical shape.

13 Claims, 4 Drawing Sheets

5,499,648

SEALING MEANS FOR PRESSURE RELIEF VALVES AND METHODS OF ASSEMBLY

BACKGROUND OF THE INVENTION

1. Field of the Invention

This invention relates to sealing means for pressure relief valves and the method of assembly for such sealing means. More particularly, the invention relates to sealing means for a valve member of a pressure relief valve which comprises a valve plate for seating on a valve seat about the inlet of the valve.

2. Description of the Prior Art

Heretofore, such as shown in U.S. Pat. No. 3,722,852 dated Mar. 27, 1973, a pressure relief valve has been provided utilizing a valve plate member mounted on a valve seat about an inlet in fluid communication with a pressure vessel. An outer portion of a flexible membrane in the '852 patent is secured to a large diameter valve plate. An inner portion of the flexible membrane is secured to a retainer plate for the membrane for clamping the membrane between the two plates along a generally transverse axis. A sealing portion of the membrane between the plates is adapted to contact and seal against the valve seat in the closed position of the valve member. Fluid pressure from the dome of the relief valve is exerted against the flexible membrane or diaphragm to urge the membrane into sealing engagement with the valve seat when the valve member is in a closed position. A fluid pressure differential area is provided between opposed faces of the flexible membrane; and the differential pressure either positive or negative urges the membrane into sealing engagement.

At times, particularly when low differential pressures are involved, bubble tight sealing will not be provided by the flexible membrane as shown in U.S. Pat. No. 3,722,852 as pressure is required to energize the seal. Increased environmental standards require substantially bubble-tight sealing at very low differential pressure or at zero differential pressure exerted against the flexible membrane or diaphragm.

SUMMARY OF THE INVENTION

The present invention is particularly directed to a pressure relief valve having a reciprocating valve member for seating on a valve seat about the inlet of the valve which is in fluid communication with a pressure vessel. The valve member includes a flexible membrane or diaphragm stretched between a valve plate and a retainer plate in a tensioned relation and adapted to contact the valve seat in a sealing relation. The retainer plate and membrane define a fluid chamber with the valve plate. An opening through the retainer plate communicates fluid from the inlet to the fluid chamber. A fluid pressure differential is exerted by inlet fluid pressure in the fluid chamber against the flexible membrane to provide substantially bubble-tight sealing when in contact with the valve seat at the closed position of the relief valve.

It has been found desirable in order to obtain substantially bubble-tight sealing at very low or zero differential pressure, that the sealing portion of the flexible membrane be in a taut or tensioned relation between the plates and of a generally frusto-conical shape. The method of assembly of the valve member includes steps to tension the membrane between the plates under a predetermined tensioning or stretching of the membrane into a frusto-conical shape. A manually actuated force exerting member is connected between the two plates along their longitudinal axes to urge the plates apart for tensioning of the membrane into the desired frusto-conical shape.

A stem or rod extends between the valve plate and a fluid pressure actuator over the valve plate. To provide for accurate alignment of the main valve member with the valve seat, the stem is secured to the valve plate about a spherical connection to provide an articulated movement between the stem and valve plate for accurate alignment and seating of the valve member on the valve. In the event of failure of the flexible membrane, a secondary sealing member is provided on the valve plate radially outwardly of the sealing portion of the membrane for sealing against a portion of the valve seat spaced radially outwardly from the membrane seal.

An object of this invention is to provide sealing means for a pressure relief valve which seals against a valve seat in a bubble-tight relation at a very low fluid pressure and a very low closing force against the main valve member.

A further object of the invention is to provide a sealing means including a flexible membrane tensioned between a valve plate and a retainer plate in a generally frusto-conical shape for sealing against the valve seat.

A further object of the invention is to provide a mechanism for a pressure relief valve in which a flexible membrane tensioned between a valve plate and a retainer plate may be automatically articulated with respect to the valve seat in order to obtain correct alignment between the membrane and the valve seat.

Another object of this invention is to provide manually adjustable means for moving the valve plate and retainer plate for the flexible membrane apart for tensioning the flexible membrane in a generally frusto-conical shape.

A further object of the invention is to provide a method of assembling the flexible membrane for the valve member of the pressure relief valve onto the generally parallel valve plate and retainer plate utilizing a manually adjustable means for moving the plates apart for tensioning the flexible membrane in a generally frusto-conical shape.

Other objects, features and advantages of this invention will be more apparent from the following specification and drawings.

DESCRIPTION OF THE INVENTION

Figure 1:
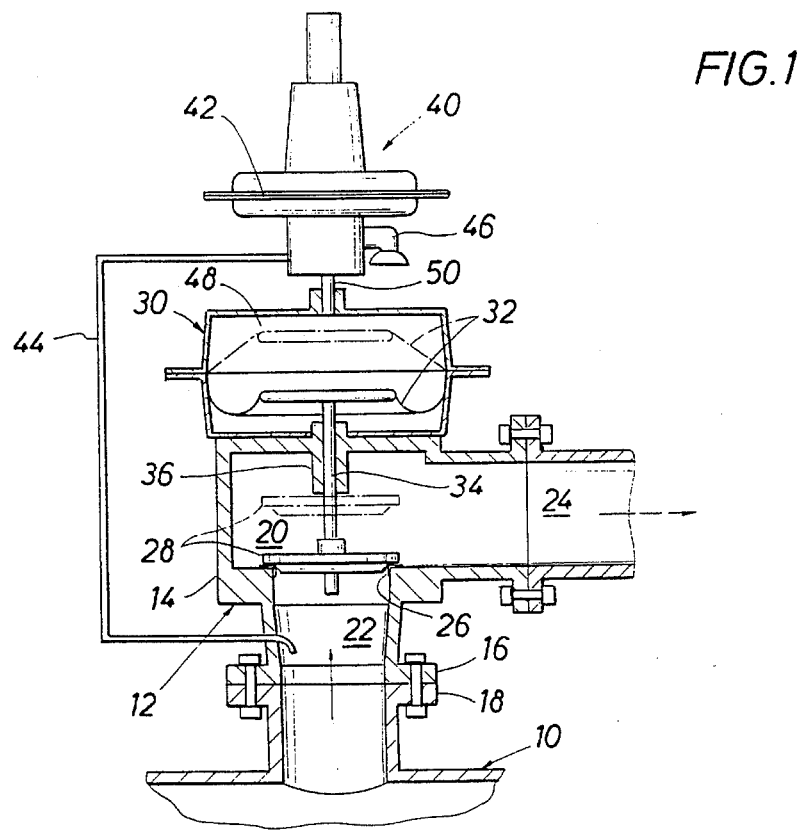
FIG. 1 is a sectional view of a pilot operated pressure relief valve having an inlet in fluid communication with a pressure vessel and a fluid pressure responsive actuator for control of the main valve member.

Referring now to FIG. 1, a pressure vessel comprising a tank 10 is shown having a pressure relief valve generally shown at 12 connected to tank 10. Relief valve 12 includes a body 14 having a lower flange 16 secured by fasteners to flange 18 of tank 10. Body 14 forms a main valve chamber 20 having an inlet 22 and an outlet 24. A valve seat or seat member generally indicated at 26 extends about inlet 22. A main valve member is shown generally at 28 in seated position on valve seat member 26 and mounted for reciprocating movement between the closed seated position and the open position shown in broken lines in FIG. 1. In some instances, seat member 26 may be eliminated with valve member 28 seating directly to body 14.

A fluid pressure responsive diaphragm actuator is shown generally at 30 and has a diaphragm 32 therein. A stem or rod 34 is secured between diaphragm 32 and main valve member 28. A sleeve 36 extending about rod 34 is secured to actuator 30 and acts to stop the upward movement of main valve member 28 when opened under an excessive fluid pressure within tank or pressure vessel 10.

A pilot valve shown generally at 40 includes a diaphragm 42 for sensing the fluid pressure in inlet 22 through line 44. An exhaust 46 extends from an outlet chamber (not shown) of pilot valve 40 for venting fluid pressure. An intermediate fluid chamber (not shown) of pilot valve 40 is in fluid communication with dome chamber 48 of actuator 30 through line 50. While tank 10 has been shown as an example of a pressure vessel with which relief valve 12 may be used, relief valve 12 and any associated pilot valve system may be employed with other types of pressure vessels, such as main flow lines.

Figure 2:
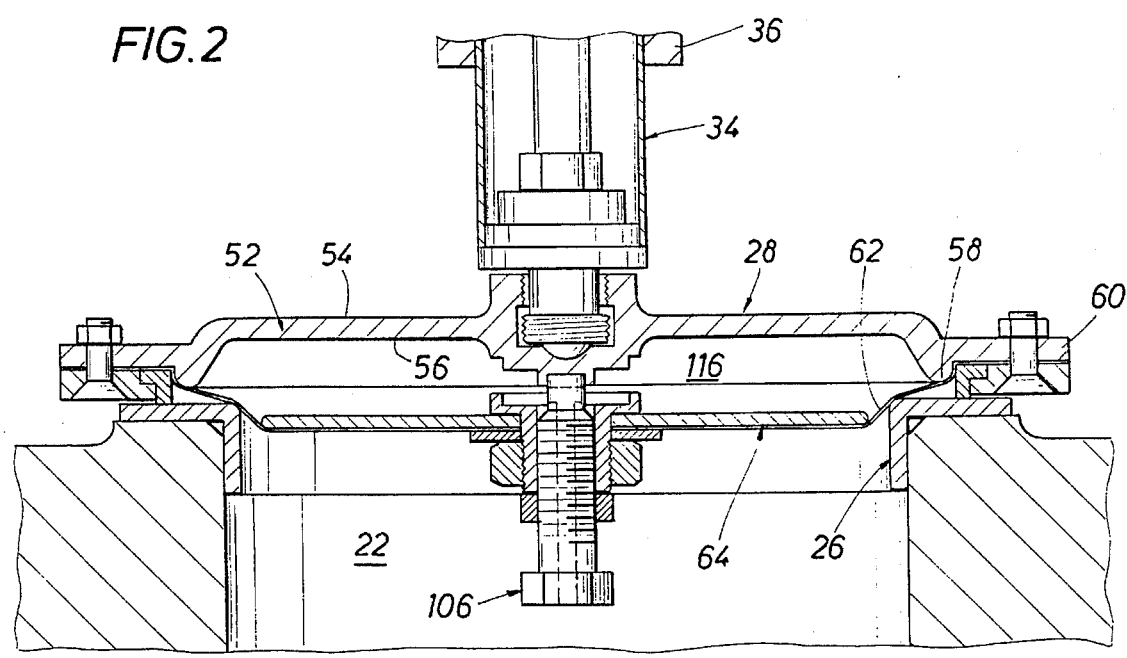
FIG. 2 is an enlarged sectional view of the main valve member of the pressure relief valve of FIG. 1 shown in a closed position seated on the valve seat with the deflection of the flexible membrane exaggerated for clarity.
Figure 3:
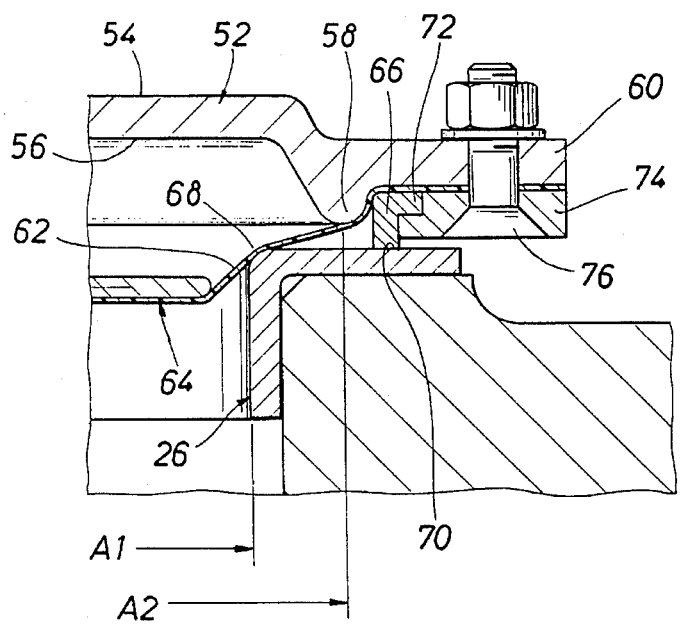
FIG. 3 is an enlarged sectional view of a portion of FIG. 2 showing the flexible membrane stretched between a valve disc forming the main valve member and a retainer plate for tensioning the flexible member therebetween in a generally frusto-conical shape.
Figure 4:
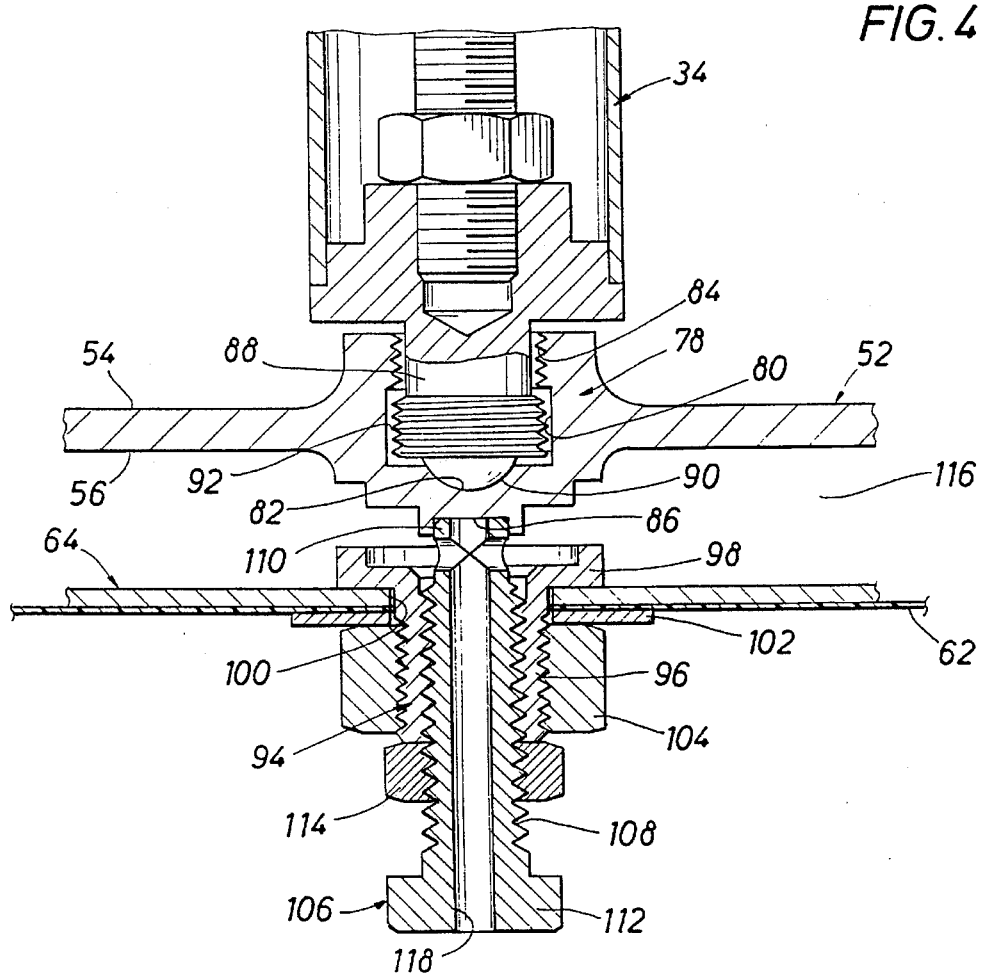
FIG. 4 is an enlarged portion of FIG. 2 illustrating the manual adjusting means for urging the valve plate and retainer plate apart for tensioning of the flexible membrane therebetween and showing the articulated connection of the rod to the valve plate.

Referring now particularly to FIGS. 2–4, main valve member 28 includes a valve disc or plate 52 having an outer face 54 and an inner face 56. A rounded inwardly extending protuberance 58 extends from inner face 56. An outer flange or rim 60 is provided along the outer marginal portion of valve plate 52. A flexible membrane or diaphragm generally indicated at 62 is secured between valve plate 52 and a spaced parallel retainer plate shown generally at 64. Membrane 62 is preferably formed of a thin FEP fluorocarbon (Teflon brand) film, or other suitable material.

Membrane 62 is arranged and dimensioned to form a primary seal against seat member 26. A separate elastomeric seal shown at 66 is arranged and dimensioned to form a secondary seal against seat member 26. Membrane 62 engages seat member 26 along a rounded sealing surface at 68, while seal 66 engages seat 26 at sealing surface 70 based radially outwardly from rounded sealing surface 68. Body 14 may be formed of aluminium, carbon steel or stainless steel, for example. Retainer plate 64 is preferably formed of a stainless steel material such as a 316 stainless steel, but may be formed of other appropriate corrosion resistant alloy materials. Seat 26 is preferably polished to be free of any scratches.

Retainer plate 64 is of a diameter smaller than the diameter of seat 26. It is received within seat 26. It projects into inlet 22 inwardly of sealing surface 68. Secondary seal 66 has an outer annular flange 72. A retainer ring 74 clamps flange 72 and a marginal portion of membrane 62 against the adjacent face of flange 60 upon the tightening of suitable fasteners 76 comprising nut and bolt combinations.

Referring now to FIG. 4, a hub generally indicated at 78 is formed centrally of valve plate 52 and has a large diameter recessed opening 80 with a concave bottom 82. A reduced diameter internally threaded entrance 84 is provided for opening 80. A recessed opening 86 is provided on an opposite side of valve member 52. Rod 34 includes a tubular sleeve and a reduced diameter projecting end portion 88. End portion 88 has a spherical convex end 90 fitting within concave portion 82 to form a socket therewith. End portion 88 has enlarged diameter external threads 92. For positioning of rod 34 within recessed opening 80, threads 84 and 92 are engaged with rod 34 rotated until threads 84 and 92 are disengaged with threads 92 being received within the enlarged diameter opening 80 and spherical surface 90 engaging concave surface 82 to form the socket. Thus, as shown in FIG. 4, an articulated connection is provided between rod 34 and valve plate 52 for the effective seating of valve plate 52, membrane 62, and seal 66 against seat member 26.

Figure 5:
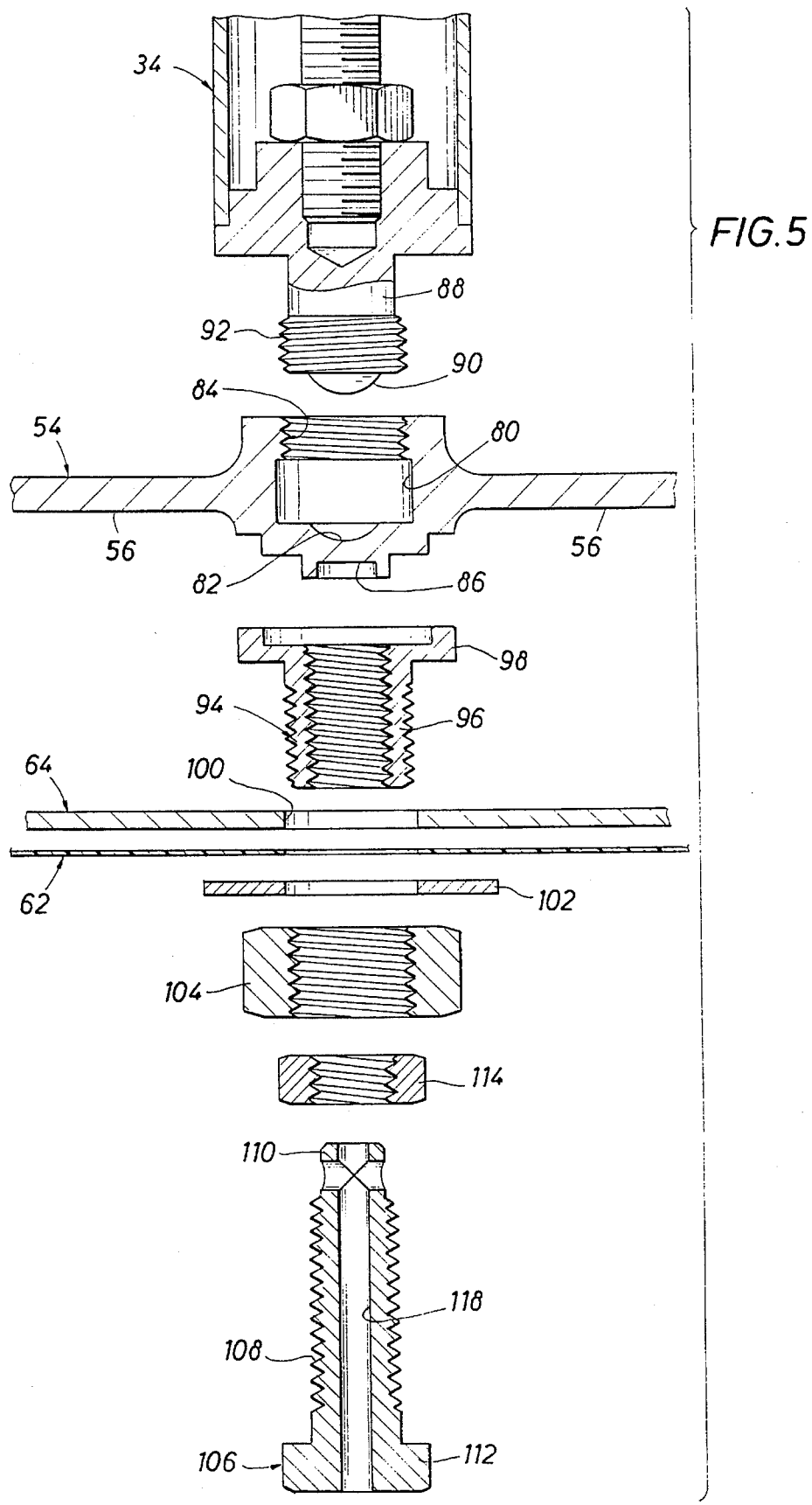
FIG. 5 is an exploded view of the connection shown in FIG. 4.
Figure 6:
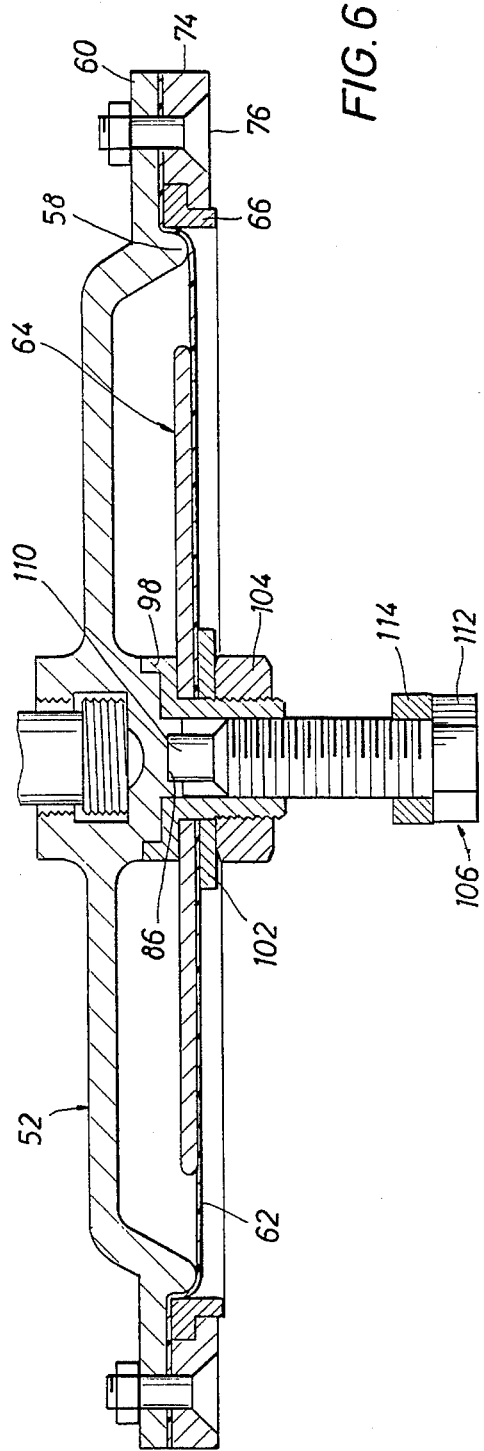
FIG. 6 is a cross sectional view showing the flexible membrane and means for tensioning the membrane into a flat wrinkle free surface prior to tensioning of the membrane.

For securing membrane 62 onto retainer plate 64 and referring now to FIGS. 4, 5 and 6, a bushing generally indicated at 94 has a body 96 which is both internally and externally threaded and has an outwardly extending flange 98. Bushing 94 fits within a central opening 100 in valve plate 64. Flange 98 engages the face of plate 64. Membrane 62 fits about bushing 94 against the lower surface or face of retainer plate 64. A washer 102 clamps membrane 62 against retainer plate 64 upon tightening of lock nut 104 threaded on bushing 94 against washer 102. A jack screw shown at 106 has an externally threaded body 108 engaging the internal screw threads of bushing 94. An inner end 110 of jack screw 106 fits within recess 86 of hub 78 on valve plate 52. An opposite extending end 112 of jack screw 106 has a hexagonal head for engagement by a suitable tool (not shown) for rotation of jack screw 106. The spacing between valve plate 52 and retainer plate 64 is controlled by jack screw 106 thereby to provide the desired tensioning of membrane 62 between retainer plate 64 and valve plate 52. A lock nut 114 threaded on jack screw 106 is tightened to produce the desired spacing of plates 52 and 64 and consequently the desired tensioning of membrane 62. The sealing portion of membrane 62 between plates 52 and 64 which engages seat 26 is of a frusto-conical shape in order to achieve a bubble-tight seal at substantially zero pressure and at substantially zero force acting against main valve member 28. The seal 66 at sealing surface 70 is a backup seal should the film seat be damaged and does not provide bubble-tight sealing at low pressure.

A fluid chamber 116 is provided between valve plate 52, retainer plate 64 and membrane 62. Jack screw 106 has a central bore shown at 118 to provide fluid communication between inlet 22 and fluid chamber 116 thereby exposing membrane 62 on opposite sides thereof to fluid inlet pressure from inlet 22 and tank 10.

Figure 7:
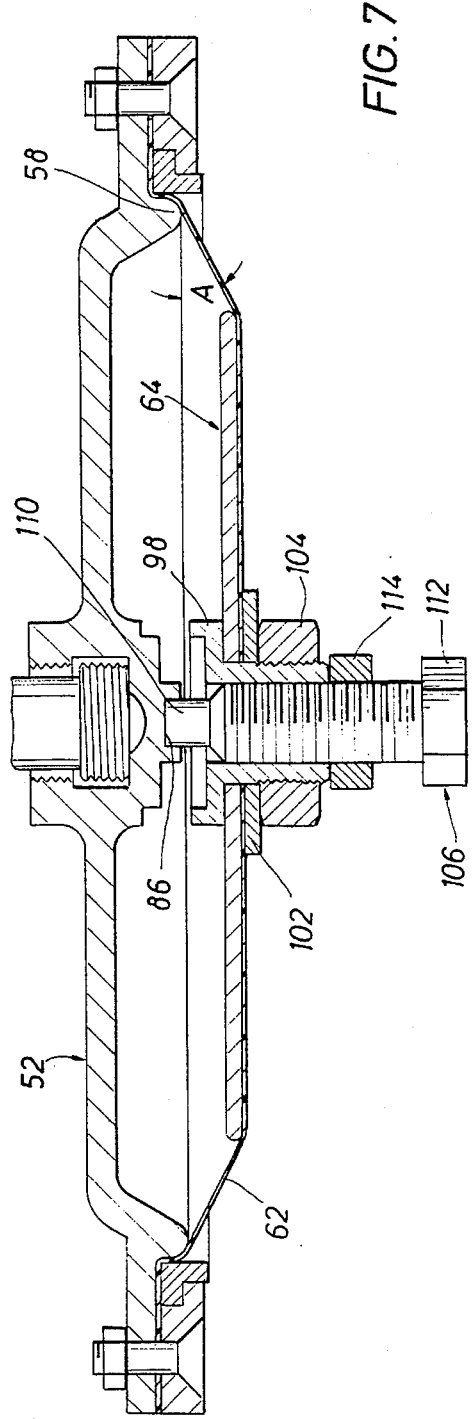
FIG. 7 is a cross sectional view similar to FIG. 6 but showing the flexible membrane and tensioning means after tensioning of the membrane into a frusto-conical shape.

Particularly with increased regulations and specifications concerning seals for corrosive or environmentally sensitive fluids, it is necessary or highly desirable that bubble-tight seals be provided even at zero pressure. To provide effective bubble-tight sealing, it is desirable that an articulated connection be provided between the valve member 28 and the stem 34 so that proper alignment can be obtained between the valve seat and the valve plate or disc 52 in closed position. The articulated connection shown in FIG. 4 between rod 34 and valve plate 52 provides a highly effective articulated connection. Additionally, diaphragm 62 is stretched in a taut relation between valve plate 52 and retainer plate 64 at valve seat member 26 to form a frusto-conical shape in order to achieve bubble-tightness at very low or zero pressures. It has been found that a relaxed membrane results in leakage at very low or zero pressures as at least a minimum pressure differential is required to seal a relaxed membrane. Thus, it is highly desirable that membrane 62 be stretched in a wrinkle free condition to provide a taut frusto-conical shape for bubble-tight sealing. An angle A for the frusto-conical shape as shown in FIG. 7 should be of a minimum of about ten (10) degrees for bubble-tight effectiveness. An optimum angle A of between thirty (30) degrees and forty five (45) degrees is preferred. By having fluid chamber 116 between valve plate 52 and retainer plate 64 exposed to fluid inlet pressure, a fluid pressure differential exists between areas A1 and A2 as shown in FIG. 3 from inlet pressure at inlet 22 to atmosphere. As indicated however, in the event of very low fluid pressure at inlet 22, sealing becomes more difficult. Thus, the present invention is design to provide bubble-tight sealing with zero pressure differential. A homogeneous sealing surface for seat member 26 with an adequate surface finish is required for effective bubble-tight sealing.

Referring now particularly to FIGS. 5–7 in which the method of assembly of the frusto-conical membrane 62 is illustrated, the various members are shown in a disassembled relation in FIG. 5. First, with face 56 of valve plate 52 facing upwardly, a circular portion of membrane 62 is placed on valve plate 52. Bushing 94 is received within central opening 100 of retainer plate 64. Membrane 62 is fitted over bushing 94 followed by washer 102. Then, lock nut 104 is tightened to clamp washer 102 and membrane 62 tightly against retainer plate 64. Then, seal 66 is fitted on retainer ring 74. Retainer ring 74 and seal 66 are then positioned over the outer marginal portion of membrane 66 against flange 60 of valve plate 52. In this position, fasteners 76 are secured in pairs at 180 degrees to each other such that membrane 62 forms a wrinkle free surface, but is in a relaxed relation between valve plate 52 and retainer plate 64.

For stretching membrane 62 into a frusto-conical shape, lock nut 114 is first threaded onto jack screw 106. Then lock nut 114 and jack screw 106 are threaded internally within bushing 94 as shown in FIG. 6. For rotating jack screw 106 to force plates 52 and 64 apart, a wrench or other suitable tool engages lock nut 104 to absorb torque. Another wrench or suitable tool engages head 112 to rotate jack screw 106 until membrane 62 is stretched to the desired frusto-conical shape as shown in FIG. 7. When the desired conical angle A and tautness are reached as shown as shown in FIG. 7, lock nut 114 may be tightened to secure jack screw 106. Next, rod or stem 34 is threaded within hub 78 until threads 84 and 92 disengage thereby to provide an articulated connection between rod 34 and hub 78 on valve plate 52. Thus, in the above manner, membrane 62 is tensioned a predetermined amount to form the frusto-conical shape without any wrinkles in order to provide bubble-tight sealing against valve seat member 26.

While main valve member 28 is illustrated herein as a valve plate, the term "valve plate" in the specification and claims herein is defined to be any valve member having a generally planar inner face such as a piston or similar valve member.

Certain changes or modifications may be made in the disclosed embodiment without departing from the inventive concepts involved. It is the aim of the appended claims to cover all such changes and modifications falling within the true spirit and scope of the present invention.

What is claimed is:

1. A method of assembling a flexible membrane in a taut relation between a valve plate and retainer plate of a pressure relief valve for providing a tight seal against a valve seat in the closed position of a relief valve; said method comprising the following steps:

placing the flexible membrane on one side of the generally flat valve plate;

securing an outer marginal portion of said flexible membrane to said valve plate;

providing a bushing for the retainer plate for fitting within a central opening of the retainer plate;

mounting the bushing within said central opening with said flexible membrane extending about the bushing;

securing said flexible membrane against said retainer plate;

mounting an adjustable force exerting member within said bushing between said valve plate and said retainer plate for forcing said plates away from each other; and adjusting said force exerting member to force said plates away from each other for tensioning said flexible membrane secured between said plates a predetermined amount to provide a taut generally frusto-conical sealing portion of said membrane extending between said plates adapted for sealing against said valve seat.

2. A method as set forth in claim 1 comprising the further steps of:

providing a fluid chamber between said valve plate and said retainer plate; and providing fluid communication to said fluid chamber through said retainer plate thereby to permit fluid communication between the inlet of said pressure relief valve and said fluid chamber for urging said membrane toward sealing relation with said seat.

3. A method as set forth in claim 1 comprising the further steps of:

providing an externally threaded screw to define a force exerting member for threading within said bushing to exert a force against said valve plate; and rotating said screw for forcing said plates apart and tensioning said flexible membrane into a frusto-conical shape between said plates.

4. A valve assembly comprising:

a body having an inlet in fluid communication with a pressure vessel and a valve seat about said inlet;

a valve member mounted on said valve seat for movement between open and closed positions, said valve member including a valve plate having an outer annular marginal portion;

a retainer plate mounted on said valve plate and having a diameter less than the diameter of said valve plate;

a flexible membrane secured radially inwardly of said retainer plate and secured radially outwardly to said valve plate to define an annular sealing portion of said membrane between said retainer plate and said valve plate adapted to contact said valve seat in sealing relation; and tension adjusting means extending between said retainer plate and said valve plate for varying the spacing between said plates for tensioning said membrane between said plates under a predetermined tensioning.

5. A pressure relief valve assembly as set forth in claim 4 wherein:

said flexible membrane is stretched between said plates into a frusto-conical shape.

6. A pressure relief valve assembly as set forth in claim 5 wherein:

said retainer plate has a diameter less than the diameter of said inlet and extends within said inlet inwardly of said seat.

7. A pressure relief valve assembly as set forth in claim 4 wherein:

said adjusting means includes a threaded member extending along the longitudinal axes of said plates between said plates for forcing said plates away from each other upon rotation of said threaded member in one direction.

8. A pressure relief valve assembly as set forth in claim 7 wherein:

an internally threaded bushing is secured to said retainer plate; and said threaded member comprises an externally threaded screw threaded within said internally threaded bushing and having an extending end in contact with said valve plate.

9. A pressure relief valve assembly as set forth in claim 4 wherein:

a diaphragm actuator is operatively connected to said valve plate to control the movement of said valve member;

a rod extends between said diaphragm actuator and said valve plate; and connection means between said rod and said valve plate mounts said rod for articulated movement on said valve plate.

10. A pressure relief valve assembly as set forth in claim 4 wherein:

said valve seat has a pair of radially spaced seating surfaces thereon to define inner and outer seating surfaces, said valve plate being seated on said outer seating surface and said membrane being seated on said inner sealing surface in the closed position of said valve member.

11. A pressure relief valve assembly as set forth in claim 10 wherein:

a fluid chamber is formed between said plates, and fluid passage means between said inlet and said chamber permits fluid flow therebetween, the effective area of said membrane exposed to fluid pressure within said chamber being larger than the effective area of said membrane exposed to fluid pressure from said inlet thereby to provide a fluid pressure differential forcing said membrane into sealing relation with said valve seat.

12. A pressure relief valve assembly as set forth in claim 10 further comprising:

pressure responsive control means coupled to said valve plate for permitting relative pivotal movement of said valve plate with respect to said valve seat for seating of said membrane to said valve seat and for seating of said valve seat on said outer seating surface.

13. A pressure relief valve assembly as set forth in claim 4 wherein:

said valve seat has a pair of radially spaced seating surfaces thereon to define inner and outer seating surfaces, said outer seating surface being generally planar to contact said valve plate and said inner seating surface being rounded to contact said flexible membrane in the closed position of said valve member.

* * * * *